United States Patent [19]
Bealky et al.

[11] Patent Number: 5,928,743
[45] Date of Patent: Jul. 27, 1999

[54] PRESSURIZED GAS VESSEL HAVING INTERNAL CHEMICAL SURFACE

[75] Inventors: Robert J. Bealky, Chandler; Michael A. Dodd; Thomas J. Moyers, II, both of Mesa, all of Ariz.

[73] Assignee: PurePak Technology Corporation, Gilbert, Ariz.

[21] Appl. No.: 08/899,847

[22] Filed: Jul. 24, 1997

[51] Int. Cl.⁶ .................................................. B65D 90/04
[52] U.S. Cl. .................... 428/35.8; 428/36.91; 428/421; 428/422; 206/6; 206/524.3; 206/524.5; 220/581; 220/586; 215/12.2
[58] Field of Search .................................... 220/581, 586; 428/35.8, 36.91, 421, 422; 215/12.2; 206/6, 524.3, 524.5

[56] References Cited

U.S. PATENT DOCUMENTS

| | | |
|---|---|---|
| 4,595,614 | 6/1986 | Nunlist . |
| 4,793,491 | 12/1988 | Wolf et al. . |
| 4,927,038 | 5/1990 | Roebuck . |
| 5,021,270 | 6/1991 | Black, Jr. et al. . |
| 5,046,638 | 9/1991 | Wolf . |
| 5,169,024 | 12/1992 | Rinkewich . |
| 5,236,669 | 8/1993 | Simmons et al. . |
| 5,384,172 | 1/1995 | Takado et al. . |
| 5,429,845 | 7/1995 | Newhouse et al. . |
| 5,441,781 | 8/1995 | Uchida et al. . |
| 5,458,258 | 10/1995 | White et al. . |
| 5,474,846 | 12/1995 | Haldenby . |
| 5,518,141 | 5/1996 | Newhouse et al. . |

FOREIGN PATENT DOCUMENTS 55115694  9/1980  Japan .

OTHER PUBLICATIONS

Du Pont, Tefzel HT–2190 fluoropolymer resin, Product Information Brochure, dated Dec. 1996.
Du Pont, Tefzel fluoropolymer resin, Technical Information Brochure, dated Aug. 1995.
Du Pont, Tefzel fluoropolymer, Properties Handbook, dated Jun. 1994.
Du Pont, Tefzel ETFE fluoropolymer MSDS, dated Feb. 25, 1996.
Sang–A Flontec Co., Ltd., Teflon Product Brochure, no date.

*Primary Examiner*—Charles Nold
*Attorney, Agent, or Firm*—William A. Simons; Thomas F. Presson; Wiggin & Dana

[57] ABSTRACT

A pressurized vessel filled with a high purity gas, said vessel having a polymeric coating covering its internal surfaces;

said high purity gases selected from the group consisting of hydrogen chloride, tungsten hexafluoride, chlorine, hydrogen bromide, nitrogen trifluoride, silanes and boron trichloride;

said vessel filled with gas pressure from about 200 psig to about 6,000 psig; and the material for said polymeric coating selected from the group of polyperfluoroalkoxyethylene, copolymer of ethylene and chlorotrifluoroethylene and copolymer of ethylene and tetrafluoroethylene.

26 Claims, No Drawings

PRESSURIZED GAS VESSEL HAVING INTERNAL CHEMICAL SURFACE

BACKGROUND OF THE INVENTION

1. Field of the Invention

The present invention relates to a pressurized vessel containing certain high purity gases under pressure therein and wherein the inner surfaces of the vessel are made by rotation molding and made of specific chemical polymers.

2. Brief Description of Art

Liquid- and gas-containing vessels having their inner surfaces covered with a polymeric coating are well known. The inner polymer coating in these liquid vessels is used to prevent corrosion of the vessel walls by the particular liquids or gases contained therein.

One example of such vessel is described in U.S. Pat. No. 5,474,846, which issued on Dec. 12, 1995 with George A. Haldenby as the named inventor. This Haldenby patent teaches a steel cylinder for holding high purity gases which has been treated to provide a uniform polymeric coating on the internal surfaces of the cylinder. The patent explicitly discloses only polyamides and polyolefins such as polyethylene and polypropylene as suitable polymeric materials. The patent also mentions that the polymeric materials may be subjected to a fluorination step to further improve the barrier properties of the polymeric materials. There are disadvantages associated with the Haldenby vessel. The separate fluorination treatment increases the cost of the vessel and may introduce unwanted impurities into the vessel. Generally, only the top surface of the polymeric layer is treated and the rest of the layer is unaffected.

It has also been believed that certain high purity gases can easily penetrate polyethylene or polypropylene layers and cause corrosion to the underlying metal walls of the vessel. The products of such corrosion can then migrate back through the polyethylene or polypropylene layer and become unwanted impurities in those high purity gases.

Alternatively, as shown in Air Products Specialty Gas Cylinder Product Brochure, page 32, hydrogen bromide and hydrogen chloride gases have been stored in carbon steel or in the presence of TEFLON, KEL-F, or HASTELLOY B material to resist corrosion. However, many types of TEFLON, KEL-F or other polymeric materials cannot be used as internal coating layers on steel cylinders because they are not suitable for rotational molding application operations. Because of these problems with internal polymeric coatings in steel cylinders, sellers of high purity gases have recently turned to using special non-corrosive metal cylinders such as nickel with no internal coating layers. However, the cost of nickel cylinders and the like is much higher than ordinary steel cylinders. The present invention provides a solution to these problems without the high cost associated with special non-corrosive metal cylinders.

BRIEF SUMMARY OF THE PRESENT INVENTION

Therefore, the present invention is directed to a pressurized vessel filled with a high purity gas, said vessel having a polymeric coating covering its internal surfaces;

said high purity gases selected from the group consisting of hydrogen chloride acid (HCl), tungsten hexafluoride ($WF_6$) chlorine ($Cl_2$), hydrogen bromide (HBr), nitrogen trifluoride ($NF_3$), silanes and boron trichloride ($BCl_3$);

said vessel filled with gas pressure from about 200 psig to about 6,000 psig; and the material for said polymeric coating selected from the group of polyperfluoroalkoxyethylene, copolymer of ethylene and chlorotrifluoroethylene and copolymer of ethylene and tetrafluoroethylene.

DETAILED DESCRIPTION OF THE PREFERRED EMBODIMENTS OF THE PRESENT INVENTION

Any suitable vessel for holding gases under high pressure may be used. Particularly applicable for storage of a gas are the standard steel industrial cylinders that are closed at one end and have a tapered threaded neck for reception of a valve in the other end. The vessels used in the present invention should preferably be of sufficient construction and thickness to withstand the gas pressures required for storage. Besides cylinders, the term "vessels" includes any other type of container that is suitable for holding the present types of gases under the pressures employed and are compatible with the internal polymeric coating used in the present invention.

As stated above, the high purity gases employed in the present invention include hydrogen chloride acid (HCl), tungsten hexafluoride ($WF_6$), chlorine ($Cl_2$), hydrogen bromide (HBr), nitrogen trifluoride ($NF_3$), silanes and boron trichloride ($BCl_3$). These corrosive gases would normally attack the inner surfaces of metal gas cylinders. The term "high purity" as used herein preferably refers to having the total impurity levels in the gas below about ten parts per million parts of gas by weight (ppm). More preferably, this level is below about 500 parts per billion parts of gas by weight (ppb) and most preferably, below about 100 parts per trillion (ppt) parts of gas by weight.

Generally, these gases are under pressures in the range of about 200 psig to about 6,000 psig in the vessel.

The present invention encompasses three (3) types of rotation moldable ("rotomold") polymers, namely, polyperfluoroalkoxyethylenes, copolymer of ethylene and chlorotrifluoroethylene and a copolymer of ethylene and tetrafluoroethylene. Polyperfluoroalkoxyethylene is also known as PFA and is a thermoplastic formed by the polymerization of a perfluoroalkoxyethylene such as shown by the following generic repeating units:

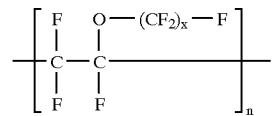

PFA polymers are generally characterized by having excellent chemical resistance to oxidizing agents, as well as having a low coefficient of function and anti-stick characteristics. Moreover, they can easily be rotomolded onto the internal walls of pressurized gas-containing vessels.

Copolymers of ethylene and chlorotrifluoroethylene (also known as ECTFE polymers) are suitable as roto-moldable polymers for the present invention. Examples of such copolymers are sold under the trademark HALAR by Ausimont USA, Inc. ECTFE copolymers are represented by the following generic repeating group formulae:

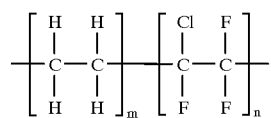

The third suitable class of roto-moldable polymers for the present invention are copolymers of ethylene and tetrafluoroethylene (also known as ETFE polymers). ETFE copolymers are represented by the following generic repeating group formulae:

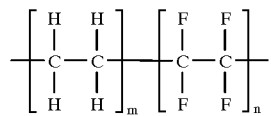

Members of this fluoropolymer class of resins are particularly suitable for use in rotational molding. These ETFE polymers are sold under the trademark TEFZEL by DuPont Polymers of Wilmington, Del. One particularly preferred ETFE polymer is TEFZEL HT-2190. It is especially designed for rotational molding for articles used in the chemical processing industries, including vessels and the like.

One preferred embodiment of the present invention involves the employment of multiple layers of different polymeric materials recited above. For example, it may be desirable to first roto-mold a fluoroplastic layer onto the internal surfaces of the vessel. The fluoroplastic layer serves as a barrier layer which promotes adhesion, reduces permeation of gases and reduces the shrinkage effect between the vessel material and the inner layers. This is, followed by roto-molding additional layers of either ECTFE or ETFE or PFA on top of the fluoroplastic layer. Alternatively, another preferred embodiment is to use a single layer or multilayers of either ECTFE or ETFE or PFA having additives contained therein. Such additives may either enhance adhesion or further improve barrier protection.

There polymeric materials are used herein before the rotomolding operation are in a particular form, such as a powder or pellet. The particular polymeric material is dispersed into the interior cavity of the cylinder. The polymeric material is added to the cylinder at a level sufficient to provide a coating of the polymeric materials having a thickness of from about 1 mm to about 15 mm, preferably from about 2 mm to about 5 mm.

After the polymeric material has been charged into the interior cavity of the cylinder, the interior cavity is blanketed with an inert gas, such as nitrogen or placed under a vacuum (preferably about 1–5 inches of mercury), to prevent oxidation of the polymeric material. The threaded neck of the cylinder is then closed.

In a typical roto-molding operation, the cylinder is then subjected to motion in at least two perpendicular axes simultaneously.

After the polymeric material is charged into the cavity of the cylinder, rotation is commenced and the polymeric material is preheated to approximately its melting temperature. The polymeric material is preferably kept at this melting temperature for about 60 minutes to about three hours. The optimum time will be dependent upon the size of the cylinder, the charge of the polymeric material, the type of roto-molding equipment and type of heating means.

The polymeric material is then brought to a temperature of from about 25° F. to about 120° F. above the melting point of the material and is maintained at that temperature for a time sufficient to melt the polymeric material and to coat the interior surface of the cylinder uniformly. The time required to effect melting and coating of the polymeric material onto the interior of the cylinder and the plug body depends, of course, on the particular polymeric material used.

In the case of PFA, the time for preheating and heating will vary from 60 minutes to 150 minutes and the melting temperature will be 450° F. to 600° F. For ECTFE or ETFE, these times will be 40 and 90 minutes and the melting temperatures will be from about 400° F. to 600° F.

The cylinder is then cooled, by immersing the cylinder in water or air cooled at ambient temperatures.

The cylinder may also be pressurized with an inert gas after cooling to maintain cleanliness and reduce corrosion or oxidization. Pressurization is preferably effected with nitrogen or argon at a pressure of from about 2 psig to about 20 psig.

After the cylinder is cooled, the cylinder is subjected to a leak test.

The vessels used in the present invention have several advantages over the prior art vessels disclosed above. They are much cheaper to make than special non-corrosive metal (e.g., nickel) vessels. The possibility of corrosion of the vessel by the pressured reactive gases is much less than the prior art vessels coated with polyethylene or polypropylene. There is less chance of impurities being introduced into the vessel than those prior art vessels where the polymeric internal coating layer was subjected to a fluorination treatment. And, they require fewer periodic cleaning treatments than prior art vessels having polymeric internal coatings applied by means other than rotation coating operation.

The present invention is further described in detail by means of the following Example. A D-1 style cylinder having the dimensions of 7 inches diameter by 10 inches length, a volume of 0.26 cubic feet was coated with polymeric resin in accordance with the method of the invention. The coating method consisted of the following steps:

1. Clean the cylinder walls by degreasing, shot blasting, vacuum baking or inert gas drying or combination thereof to remove debris and processing liquids as well as moisture.
2. Purge with nitrogen prior to polymer filling.
3. Fill the cylinder with 3.2 pounds of TEFZEL HT-2190 resin from Dupont under clean conditions.
4. Insert gas valve into the cylinder.
5. Torque gas valve into the cylinder with automatic torque control equipment.
6. Securely fixture the cylinder onto the rotomolding carousel arm.
7. Index the carousel arm into the oven and start the preheating process. The preheat process consists of heating the cylinder to 485° F. for twenty minutes.
8. The rotation is started and the oven temperature is increased to 570° F. for one hour and twenty minutes.
9. After the melt cycle, index the carousel arm out of the oven into the cooling chamber.
10. In the cooling chamber, cool the cylinder with forced air and a chilled water spray to slow cool the polymeric material to ambient conditions. As in the heat cycle the cylinder is rotated in two perpendicular axes to maintain an even cool down and prevent polymeric displacement.
11. After the cooling cycle index the carousel arm out of the cooling chamber into the load/unload station. Here the cylinder is removed from the fixture.

12. Next fill the cylinder to 35 psig with clean, dry nitrogen. This operation allows for a pressure test to verify cylinder joint integrity. After the leak test is completed, the valve is closed and leak test connections are removed.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A pressurized vessel filled with a high purity gas, said vessel having a rotation moldable polymeric coating covering its internal surfaces;

said high purity gases selected from the group consisting of hydrogen chloride, tungsten hexafluoride, chlorine, hydrogen bromide, nitrogen trifluoride, silanes and boron trichloride;

said vessel filled with gas pressure from about 200 psig to about 6,000 psig; and the material for said rotation moldable polymeric coating selected from the group of polyperfluoroalkoxyethylene, copolymer of ethylene and chlorotrifluoroethylene and copolymer of ethylene and tetrafluoroethylene.

2. The pressurized vessel of claim 1 wherein said vessel is a steel cylinder.

3. The pressurized vessel of claim 1 wherein said polymeric coating is a rotation moldable polyperfluoroalkoxyethylene.

4. The pressurized vessel of claim 3 wherein said high purity gas is hydrogen chloride.

5. The pressurized vessel of claim 3 wherein the high purity gas is tungsten hexafluoride.

6. The pressurized vessel of claim 3 wherein the high purity gas is chlorine.

7. The pressurized vessel of claim 3 wherein the high purity gas is hydrogen bromide.

8. The pressurized vessel of claim 3 wherein the high purity gas is nitrogen trifluoride.

9. The pressurized vessel of claim 3 wherein the high purity gas is a silane.

10. The pressurized vessel of claim 3 wherein the high purity gas is boron trichloride.

11. The pressurized vessel of claim 1 wherein said polymeric coating is a rotation moldable copolymer of ethylene and chlorotrifluoroethylene.

12. The pressurized vessel of claim 11 wherein said high purity gas is hydrogen chloride.

13. The pressurized vessel of claim 11 wherein the high purity gas is tungsten hexafluoride.

14. The pressurized vessel of claim 11 wherein the high purity gas is chlorine.

15. The pressurized vessel of claim 11 wherein the high purity gas is hydrogen bromide.

16. The pressurized vessel of claim 11 wherein the high purity gas is nitrogen trifluoride.

17. The pressurized vessel of claim 11 wherein the high purity gas is a silane.

18. The pressurized vessel of claim 11 wherein the high purity gas is boron trichloride.

19. The pressurized vessel of claim 1 wherein said polymeric coating is a rotation moldable copolymer of ethylene and tetrafluoroethylene.

20. The pressurized vessel of claim 19 wherein said high purity gas is hydrogen chloride.

21. The pressurized vessel of claim 19 wherein the high purity gas is tungsten hexafluoride.

22. The pressurized vessel of claim 19 wherein the high purity gas is chlorine.

23. The pressurized vessel of claim 19 wherein the high purity gas is hydrogen bromide.

24. The pressurized vessel of claim 19 wherein the high purity gas is nitrogen trifluoride.

25. The pressurized vessel of claim 19 wherein the high purity gas is a silane.

26. The pressurized vessel of claim 19 wherein the high purity gas is boron trichloride.

* * * * *